Feb. 28, 1961

E. E. HOOD ET AL 2,972,908

SEMI-AUTOMATIC TWO-SPEED HUB AND COASTER
BRAKE FOR VELOCIPEDES AND THE LIKE

Filed May 29, 1959

WITNESS:

Esther M. Stockton

INVENTORS
Edwin Elliott Hood
Hollis K. Gleasman

BY

Clinton S. Janes

ATTORNEY

INVENTOR.
Edwin Elliott Hood
BY Hollis K. Gleasman

Clinton S. Janes
ATTORNEY

United States Patent Office 2,972,908
Patented Feb. 28, 1961

2,972,908

SEMI-AUTOMATIC TWO-SPEED HUB AND COASTER BRAKE FOR VELOCIPEDES AND THE LIKE

Edwin Elliott Hood and Hollis K. Gleasman, Elmira, N.Y., assignors to The Bendix Corporation, a corporation of Delaware Filed May 29, 1959, Ser. No. 816,786

5 Claims. (Cl. 74—750)

The present invention relates to a semi-automatic two-speed hub and coaster brake for velocipedes and the like, and more particularly to that type in which the shift from one gear ratio to the other is brought about by a slight backward rotation of the driving member.

It is an object of the present invention to provide a semi-automatic two-speed hub which is efficient and reliable in operation while being simple and economical in construction.

It is another object to provide such a device which has fewer moving parts than earlier types of such hub gearing, and the parts are of simple structure adapted to economical fabrication.

The present invention is an improvement over the structure shown in the application of Hood and Gleasman, Serial Number 759,054, filed September 4, 1958, assigned to the assignee of the present application. In the referred to Hood and Gleasman application the means under the control of the operator for blocking the engaging movement of the high speed clutch nut comprises a pawl indexing sleeve fixedly secured to the high speed screw shaft from which radially outwardly extending pawl fingers project. Rotatably journalled but axially confined on the indexing sleeve is a ratchet selector sleeve which has a cylindrical body having circumferentially spaced openings engageable by the pawl fingers of the indexing sleeve. Also provided on the ratchet selector sleeve are circumferentially spaced radially projecting lug members. Fixedly secured to the high speed clutch nut is a detent and abutment member which has circumferential spaced spring fingers frictionally engaging the cylindrical surface. A slight amount of backward rotation of the high speed screw shaft and the indexing member secured thereto causes the pawl fingers to engage the next opening in the cylindrical body of the ratchet selector sleeve. The ratchet selector sleeve is restrained against rotation by its frictional engagement with the high speed clutch nut. Upon resumption of forward rotation the ratchet selector sleeve is indexed forwardly on the indexing sleeve an amount equal to the spacial separation between the cylindrical openings. This rotary displacement causes the lug members to be brought into registry with either the spring fingers or the slot like openings between the spring fingers of the detent and abutment member thus allowing or blocking the high speed clutch nut from drivingly engaging the hub. In attaining the objects set forth above blocking means have been devised in this invention incorporating novel and simplified structures. In the present invention a single indexing and abutment ring is rotatably journalled but axially confined on the high speed screw shaft with integral pawls and lugs being provided thereon. The high speed screw shaft is provided with ratchet teeth. Frictional retardation of the indexing and abutment ring by a selector spring sleeve fixedly secured to the high speed clutch causes the indexing ring pawls to engage the next ratchet tooth upon reverse rotation of the high speed screw shaft thereby indexing the lug member into or out of engagement with slot means on the selector spring sleeve. The movement of the lugs into or out of engagement with the slots thus alternately allow or block the high speed clutch nut from drivingly engaging the hub.

Further objects and advantages will be apparent from the following description taken in connection with the accompanying drawing in which.

Figure 1:
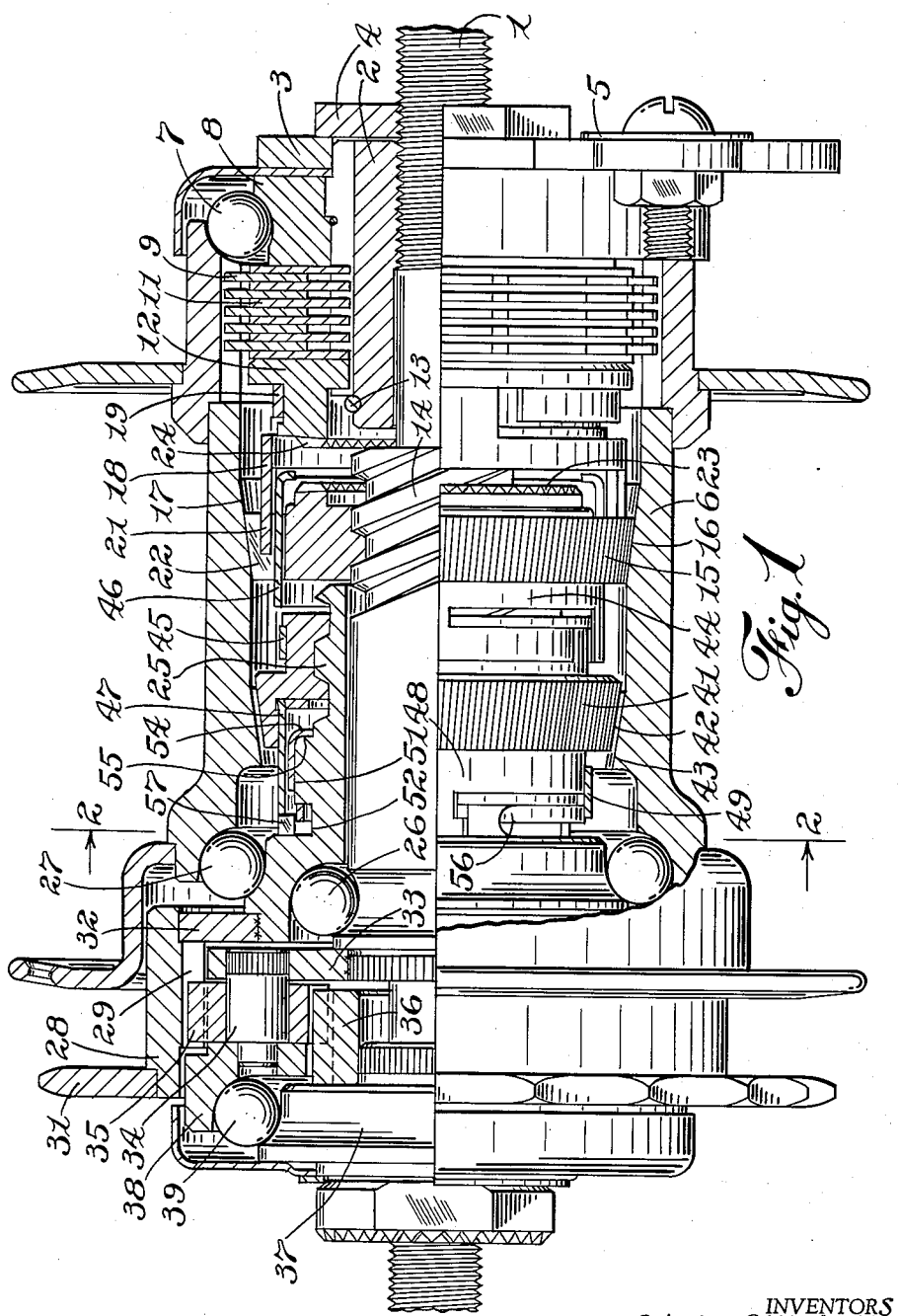
Fig. 1 is a side elevation, partly broken away and in section, of a preferred embodiment of the invention.

In Fig. 1 of the drawing there is illustrated a stationary axle 1 adapted to be mounted in the rear fork of a bicycle or the like. A brake anchor sleeve 2 is threaded on the axle 1 and held from rotation by an anchor arm 3 non-rotatably mounted thereon, retained by a clamping nut 4 and prevented from rotation by a clip 5 adapted to be attached to a frame member of the vehicle in conventional manner.

A hub 6 is rotatably mounted on the anchor sleeve 2 by means of bearings 7, seated on a bearing cone 8 fixedly mounted on the anchor sleeve. Brake discs 9 and 11 are splined alternately to the hub 6 and anchor sleeve 2 and are arranged to be pressed against the bearing cone 8 by means of a brake actuating member 12 splined on the anchor sleeve and loosely retained thereon by a lock ring 13.

A low-speed screw shaft 14 is rotatably mounted on the axle 1 and has a low-speed clutch nut 15 threaded thereon having a conical clutch surface 16 adapted to engage a conforming surface 17 formed in the interior of the hub 6. A retarder sleeve 18 having arms 19 bearing frictionally on the periphery of the brake actuating member 12, has a plurality of axially extending fingers 21 slidably engaging in axially extending slots 22 formed in the periphery of the low-speed clutch nut 15 to form a splined connection therewith. Rotation of the low-speed screw shaft 14 in a forward direction as indicated by the arrow in Fig. 1 thus causes said clutch nut to engage and drive the hub, while backward rotation of said screw shaft causes the clutch nut to engage and operate the brake actuating member 12 to compress the brake discs 9, 11. The engaging faces of the low-speed clutch nut 15 and brake actuating member 12 are provided with dentils 23, 24, respectively, in order to prevent relative rotation when in engagement.

A high speed screw shaft 25 is rotatably mounted on the low-speed screw shaft 14 by means of bearings 26, and in turn rotatably supports the adjacent end of the hub 6 by means of bearings 27. A driving member 28 incorporating an orbit gear 29 has a sprocket 31 fixedly mounted thereon in any suitable manner, and is united with the high speed screw shaft 25 by a ring member 32 rigidly connected thereto and mounted on the adjacent end of the high speed screw shaft by suitable means such as brazing.

A planet carrier ring 33 is fixedly mounted on the end of the low-speed screw shaft 14 and has a plurality of pintles 34 fixedly mounted therein and serving as bearings for planet pinions 35 which engage in the orbit gear 29. Said pinions also mesh with a sun gear 36 rigidly mounted on a stationary bearing cone member 37 which is threaded on the axle 1. A bearing cup member 38 receives and supports the ends of the pintles 34 and is rotatably mounted on the cone member 37 by means of bearings 39.

A high speed clutch nut member 41 is threaded on the high speed screw shaft 25 and has a conical periphery 42 adapted to be moved into and out of clutching engagement with a conforming clutch surface 43 in the interior of the hub 6. A retarder sleeve 44 is provided with arms 45 bearing frictionally on the high speed clutch nut 41 and has fingers 46 engaging in the slots 22 in the periphery of the low-speed clutch nut 15 so as to form a splined connection therewith.

Figure 3:
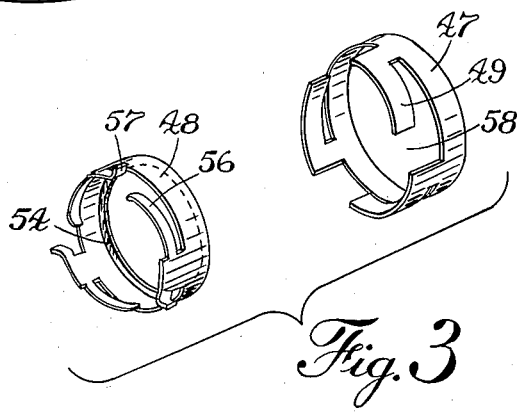
Fig. 3 is a detail in perspective of the selector spring sleeve and the indexing and abutment ring shown in disassembled relation.

A selector spring sleeve 47 (Fig. 3) is rigidly mounted in a counterbore in the end of the high speed clutch nut 41 and an indexing and abutment ring 48 is swiveled on the high speed screw shaft 25 within said selector spring sleeve. Spring arms 49 on the selector spring sleeve bear on the periphery of the indexing and abutment ring 48 to form a frictional rotary connection therebetween.

Figure 2:
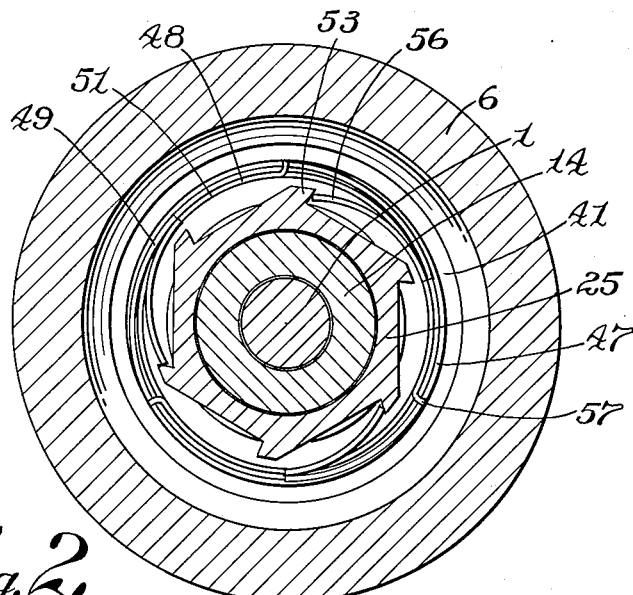
Fig. 2 is a section taken substantially on the plane of line 2—2 of Fig. 1.

The high speed screw shaft 25 has a smooth portion 51 on which the abutment ring rotates freely, and has a circumferential channel 52 formed therein adjacent to said smooth portion. A plurality of ratchet teeth 53 (Fig. 2) are formed at the bottom of said channel. The indexing and abutment ring 48 is provided at one end with an inwardly bent flange 54 which bears against a shoulder 55 on the high speed screw shaft, and adjacent its other end said ring has a plurality of elastic pawls 56 extending into the channel 52 to thereby prevent axial movement of the ring. The ends of the pawls 56 engage the ratchet teeth 53 to form an overrunning clutch connection from the high speed screw shaft to said indexing and abutment ring. Said ratchet teeth are preferably undercut slightly as shown in order to prevent disengagement of the pawls under load.

The abutment ring 48 is also provided with outwardly directed tongues or lugs 57 which extend into the path of axial movement of the arms 49 of the selector spring sleeve 47. As best seen in Fig. 1, when these abutment lugs 57 are in registry with said arms 49, they arrest the axial movement of the high speed clutch nut 41 and prevent said clutch nut from engaging the hub. When the abutment lugs 57 register with the spaces 58 between the arms 49 of the selector spring sleeve, the high speed clutch nut is permitted to engage and drive the hub 6.

There are twice as many ratchet teeth 53 as there are abutment lugs 57 on the ring 48 and arms 49 on the sleeve 47. As herein illustrated, there are three abutment lugs, three arms 49 and six ratchet teeth 53. The relationship of the ratchet teeth 53 with the threads of the high speed screw shaft 25 and the orientation of the selector spring sleeve 47 in the high speed clutch nut 41 is such that as the abutment ring 48 is indexed step by step with respect to the ratchet teeth 53 the abutment lugs 57 are brought into registry alternately with the arms 49 and with the spaces 58 between said arms.

In operation, starting with the parts in the positions illustrated in Fig. 1, forward rotation of the driving member 28 by the sprocket 31 is transmitted to the high speed screw shaft 25, but since the abutment lugs 57 are in abutting relation with the arms 49 of the selector sleeve 47, the high speed clutch nut 41 is prevented from engaging the hub. The low-speed screw shaft 14 is also rotated by means of the planetary gearing 29, 35, 36 whereby the low-speed clutch nut 15 is traversed into driving engagement with the hub 6 and rotates it in low gear.

When it is desired to operate in high gear, the operator back pedals slightly, thus rotating the high speed screw shaft 25 backwardly. The high speed clutch nut 41 is prevented from such backward rotation by its frictional connection through the retarders 44, 18 to the axle 1 whereby the selector spring sleeve 47 is also prevented from rotation, and the indexing and abutment ring 48 is held from rotation by its frictional connection 49 with the selector spring sleeve 47. The abutment ring is thus indexed one tooth forwardly on the high speed screw shaft. Upon subsequent forward rotation of the driving member, since the abutments 57 on the abutment ring 48 now register with the spaces 58 between the arms 49 of the selector spring sleeve 47, the high speed clutch nut is now permitted to engage and drive the hub 6 at the same speed as the driving member 28.

Figure 4:
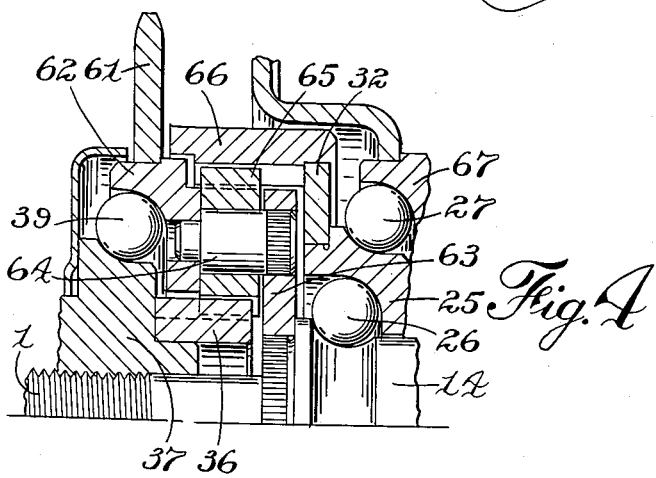
Fig. 4 is a sectional detail of a second embodiment of the invention.

In Fig. 4 of the drawing, there is illustrated an embodiment of the invention in the form of an over-drive instead of the under-drive or hill climb gearing shown in Fig. 1. In this embodiment, the driving sprocket 61 is mounted on the bearing cup member 62 forming part of the planet carrier 63 having the pintles 64 on which the planets 65 are rotatably mounted. The orbit gear 66 is rigidly connected to the high speed screw shaft 25 on which the hub 67 is rotatably mounted. The remaining parts are the same as in the embodiment first described and are similarly numbered.

The operation of this embodiment is the same as above described except that the low-speed screw shaft now rotates at the same speed as the sprocket 61 whereas the high speed screw shaft is rotated at a higher speed by means of the planetary gearing 36, 65, 66.

Although certain structure has been shown and described in detail it will be understood that changes may be made in the design and arrangement of the parts without departing from the spirit of the invention.

We claim:

1. In a two-speed rear hub for velocipedes and the like, a fixed axle, a low-speed screw shaft journalled thereon, a high-speed screw shaft rotatably mounted on the low-speed screw shaft, a hub rotatably mounted relative to the fixed axle, a driving member, means for rotating both screw shafts from the driving member at different gear ratios, a low-speed clutch nut threaded on the low-speed screw shaft for movement into and out of clutching engagement with the hub, a high-speed clutch nut threaded on the high-speed screw shaft for movement into and out of clutching engagement with the hub, retarder means for frictionally resisting rotation of said clutch nuts and means under the control of the operator for blocking the engaging movement of the high-speed clutch nut including a selector sleeve fixedly mounted on the high-speed clutch nut, an indexing and abutment ring swivelled on the high-speed screw shaft in the path of travel of the high-speed clutch nut, said selector sleeve having equally spaced, circumferentially arranged spring arms bearing frictionally on the abutment ring, said abutment ring having similarly spaced radial lugs movable into and out of the path of said arms, said abutment ring also having a spring pawl bearing on the periphery of the high-speed screw shaft, said high-speed screw shaft having ratchet teeth formed thereon for cooperating with said pawl to index the abutment ring on the high-speed screw shaft responsive to backward and forward rotation of the high-speed screw shaft.

2. A two-speed hub as set forth in claim 1 in which the ratchet teeth on the high-speed screw shaft are so positioned and circumferentially spaced that engagement of said pawl with successive teeth indexes the abutment ring to bring the radial lugs thereon alternately into and out of the path of the arms on said selector sleeve.

3. A two-speed hub as set forth in claim 2 in which the ratchet teeth on the high-speed screw shaft are formed with axially extending torque-transmitting faces which are undercut to prevent said pawl from slipping off the teeth under load.

4. A two-speed hub as set forth in claim 1 in which the high-speed screw shaft is formed with a smooth bearing surface on which the indexing and abutment ring is rotatably mounted, and said ratchet teeth are formed in the bottom of a circumferential channel adjacent said bearing surface, said pawl on the abutment ring extending into said channel to engage the ratchet teeth, and to act as a retainer to prevent axial displacement of the abutment ring.

5. A two-speed hub as set forth in claim 4 in which the high-speed screw shaft is formed with a radial shoulder, and the abutment ring is formed with an inwardly directed flange having a thrust bearing against said shoulder.

References Cited in the file of this patent
UNITED STATES PATENTS

| | | |
|---|---|---|
| 2,410,785 | Hood | Nov. 5, 1946 |
| 2,837,187 | Hood | June 3, 1958 |
| 2,865,478 | Hood | Dec. 23, 1958 |
| 2,882,754 | Gleasman | Apr. 21, 1959 |
| 2,882,755 | Gleasman | Apr. 21, 1959 |